United States Patent [19]

den Hollander

[11] Patent Number: 4,931,870

[45] Date of Patent: Jun. 5, 1990

[54] RAPID ACCESS TELETEXT DECODER ARRANGEMENT

[75] Inventor: Willem den Hollander, Schlieren, Switzerland

[73] Assignee: RCA Licensing Corporation, Princeton, N.J.

[21] Appl. No.: 316,830

[22] Filed: Feb. 28, 1989

[30] Foreign Application Priority Data

Mar. 18, 1988 [GB] United Kingdom ................ 8806479
May 23, 1988 [GB] United Kingdom ................ 8812136

[51] Int. Cl.$^5$ ..................... H04N 7/04; H04N 7/087
[52] U.S. Cl. .................................... 358/142; 358/147
[58] Field of Search ..................... 358/142, 146, 147

[56] References Cited

U.S. PATENT DOCUMENTS

| | | | |
|---|---|---|---|
| 4,626,913 | 12/1986 | Gurumurthy | 358/147 |
| 4,679,083 | 7/1987 | Schmitz | 358/147 |
| 4,701,794 | 10/1987 | Fröling et al. | 358/147 |
| 4,837,620 | 6/1989 | Harvey | 358/142 |

OTHER PUBLICATIONS

A data sheet for teleview data acquisition chip MR9710, published by Plessey Semiconductors Ltd., pp. 59–65.
Data sheet for videotext data slicer and clock regenerator SL9100EXP, publ. by Plessey Semiconductors Ltd. (Attention to Fig. 4).
"Applications of Picture Memories in Television Receivers", Berkhoff, et al., published in IEEE Transactions on Consumer Electronics, vol. CE-29, No. 3, Aug. 1983.
Philips publication No. 9398 401 30011, dated Jan. 1985, entitled "ICS for Computer Controlled TV Memory Based Feature", pp. 27–41.
Development data sheet, dated 1986, entitled "SAA9030 Background Memory Controller", published by Philips Corp.
Development data sheet, dated 1988, entitled "SAA9040 Computer Controlled Teletext Extension (CCTE)", published by Philips Corp.
User's Manual, entitled "Computer Controlled Teletext User's Manual", dated 1983, by J. R. Kinghorn, published by Mullard Application Laboratory.
IBA Technical Review, No. ISSN 0308-423 X entitled "Specification of Standard for Broadcast Teletext Signals."
Design Handbook entitled "The Programmable Gate Array Design Handbook", dated 1986, published by Xilinx Co., San Jose, California, pp. 2–114 to 2–117.
Data Book Entitled "the Programmable Gate Array Data Book", including a note entitled Megabit FIFO in two Chips: One LCA and One Dram, by Alfke, published 1988 by Xilinx Co., pp. 6–35 and 6–36.

Primary Examiner—John W. Shepperd
Assistant Examiner—Michael D. Parker
Attorney, Agent, or Firm—Joseph S. Tripoli; Joseph J. Laks; Sammy S. Henig

[57] ABSTRACT

A teletext decoder includes a background or buffer memory operating as a first-in, first-out (FIFO) memory. The buffer memory is used for storing a large number of teletext pages. A given video line that contains teletext information is identified as such by the detection of part of a clock run-in sequence followed by the framing code. The video line is then stored in the background memory. After a user page request occurs, the background memory is read-out by a data processor operating in a full channel mode of operation for obtaining the information of the requested page. As long as the read-out operation has not been terminated, incoming teletext data is stored in the background memory. This enables teletext data received prior to termination of the read-out operation to be read out and processed by the data processor.

33 Claims, 5 Drawing Sheets

FIG. 1  TYPICAL PRIOR ART TELETEXT DECODER

FLOW DIAGRAM OF PAGE REQUEST OPERATION

RAPID ACCESS TELETEXT DECODER ARRANGEMENT

This invention relates to a teletext decoder employing a so-called background or buffer memory for storing multipages of teletext incoming data.

Teletext is a television-based communication technique in which a given horizontal video line is utilized for broadcasting textual and graphical information encoded in a digital binary representation. Such horizontal video line signal that contains teletext data is referred to herein as a Data-line. It is assumed herein, for explanation purposes, that teletext is sent by the broadcaster only during the vertical blanking interval (VBI), when no other picture information is sent. The organization of the binary information in the broadcast signal is determined by the standard employed by the broadcaster. By way of an example only, references are made herein to a teletext based on a standard referred to by the British Broadcasting Corporation (BBC) as CEEFAX.

Each Data-line carries data synchronizing and address information and the codes for a Row of 40 characters. The synchronizing information includes a clock run-in sequence followed by an 8-bit framing code sequence. Each Data-line contains a 3 bit code referred to as the Magazine number. A teletext Page includes 24 Rows of 40 characters, including a special top Row called the Page-Header. Each ROW is contained in a corresponding Data-line. A user selected Page is intended to be displayed in place of, or added to a corresponding television picture frame. A Magazine is defined to include Pages having Data-lines containing a corresponding Magazine number. The transmission of a selected Page begins with, and includes its Page Header and ends with and excludes the next Page Header of the selected Magazine number. All intermediate Data lines carrying the selected Magazine number relate to the selected Page.

FIG. 1 illustrates a block diagram of a conventional teletext decoder that includes an integrated circuit (IC) referred to herein as video input processor (VIP) such as, for example, of the type SAA5231 made by Philips Corporation. The VIP receives a baseband composite video signal VIDEO that contains Data-lines. The VIP performs data slicing, clock regeneration and timing synchronization functions and generates a serial data signal DATA and an associated clock signal CLOCK. Signals DATA and CLOCK represent the data contained in the horizontal video lines. Signals DATA and CLOCK are coupled to a second IC of the decoder, referred to herein as computer controlled teletext IC (CCT) that includes a data processor responsive to signals DATA and CLOCK. An example of such CCT is IC SAA5243 made by Philips Corporation.

The CCT performs data acquisition and interface function with a page memory that is included in the teletext decoder. For example, only a teletext Page requested by the user is derived by the CCT from the serial data and clock signals and stored in the page memory. The CCT also generates video display signals R,G, and B from the teletext data stored in the page memory to provide corresponding drive signals that contain picture information for display in the receiver picture tube (CRT), not shown.

A control microcomputer, not shown in FIG. 1, that is responsive to user initiated commands, generates control and status messages. The messages are coupled via, for example, a standard IIC bus to the CCT, for controlling the operation of the CCT.

A total of, for example, 500 Pages may be periodically transmitted during each interval of 15–45 seconds, depending on the number of Data-lines used for teletext during the VBI. Consequently, if the teletext Page is not already stored in memory when a new user page request occurs, the user may experience a nuisance as a result of waiting a maximum of 15–45 seconds until the requested Page is displayed. It may be desirable to reduce such Page access time. It may also be desirable to utilize in the teletext decoder a standard CCT such that the reduction of the access time is provided as an add-on feature to the teletext decoder.

A teletext decoder, embodying an aspect of the invention, includes a background or buffer memory that is capable of storing multi-Pages of teletext data. The portion of serial data signal DATA generated by the VIP that meets a predetermined identification criteria and, therefore, assumed to represent a Data-line is stored in the buffer memory. At any given time after the operation of the buffer memory is enabled, such as immediately after the user turns on the television receiver, the buffer memory contains, for example, the most recently received teletext Pages. The maximum number of such Pages that can be contained in the buffer memory at any given time is determined by the buffer memory Page storage capacity.

In order to reduce the size of the hardware required to identify each video line that is assumed to be a Data-line, only a limited, rather than a complete identification operation, is initially performed. The complete identification is accomplished in the CCT, during a read-out operation, when the data is read-out of the buffer memory.

In accordance with a feature of the invention, the limited identification operation for identifying a given Data-line is accomplished by identifying in a video line signal data of a sequence of the clock run-in that is immediately followed by a sequence of the framing code. When, for example, both sequences are identified it is assumed that a Data-line is identified. Therefore, a portion of such identified Data-line that contains relevant data bits is stored in the buffer memory. Otherwise, the video line information is not stored in the buffer memory. The inclusion of the test for the data of the clock run-in sequence, advantageously, reduces the probability that the data that is stored is, in fact, not a Data-line.

When the user's page request occurs, the data processor of the CCT receives the data that have been stored in the buffer memory and searches for the presence of a Data-line representing a Page Header of the requested Page. The search operation that is included in the read-out operation begins when the first data is read out of the buffer memory following the occurrence of the user's page request.

Memory read-out cycles occur between VBI's, when no teletext data is received. If the Page Header of the user requested teletext Page is found in the buffer memory in the course of such memory scan or search operation, the stored data of the Page Header is transferred to the page memory.

During the search operation, the CCT operates in the full channel operation mode. In the full channel operation mode, the Data-lines in the buffer memory are read out and transferred to the page memory in a first-in, first-out manner and without encountering large time gaps. Such large time gaps occur when teletext information is received by the CCT only during the VBI's. Therefore, the search operation occurs faster than if the Data lines were received, unbuffered, only during the VBI's. For example, the access time to a teletext Page that is already contained in a buffer memory capable of storing 500 teletext Pages may be reduced to, for example, 0.8 seconds that is, advantageously, substantially shorter than the 15-45 seconds maximum access time, referred to before. Furthermore, should more than, for example, 600 pages be transmitted, the access time for a page which, at the time the user page request occurs, is not already stored in the memory, is reduced by the time required to fill the buffer memory with teletext data.

After the Page Header is identified in the CCT, other Data-lines that are associated with the requested Page and that are stored in the buffer memory are read-out. On the other hand, if no Page Header Data-line of the requested teletext Page is found in the buffer memory in the course of the search operation, the unbuffered data received from the VIP will be coupled, after the end of the search operation, directly to the data processor of the CCT such that the buffer memory is bypassed.

When a buffer memory with large storage capacity is utilized, the read-out operation that was explained before may require a longer interval than the interval between consecutive VBI's. It may be desirable to store incoming Data-lines in the buffer memory that occur during the intervening VBI's prior to the completion of the read-out operation. If such incoming Data-lines of the Page requested by the user were not stored, an undesirable situation might have occurred in which only a partial Page is temporarily displayed on the CRT. Such temporary condition may continue until after the time when the same Page is re-transmitted.

In the teletext decoder, embodying an aspect of the invention, the read-out operation in the buffer memory occurs only outside the VBI's. Data-lines are stored in the buffer memory during the VBI's that occur prior to the completion time of the read-out operation. Therefore, Data-lines that were stored in the buffer memory after the read-out operation has been initiated and prior to its termination may be read-out and processed by the CCT. In this way, advantageously an incoming Data-line that is included in the teletext Page that is requested may be processed during the read-out operation Each Data-line is stored in the background memory and provided to the CCT in a format that can be readily processed by the CCT. For example, a Data-line is stored as 344 bits that include a byte containing the framing code, two bytes containing hamming codes and forty bytes containing the remaining data.

The buffer memory of the decoder of the invention is organized as a serial memory such as, for example, a first-in, first-out memory (FIFO). For example, immediately after teletext signal is received in the television receiver, the Data-lines are stored in the FIFO even if no user page request occurs. Thus, at the time the user changes the mode of operation of the television receiver from providing normal picture program to providing teletext information, the most recently received teletext data are already stored in the buffer memory.

The buffer memory may utilize, advantageously, a dynamic random access memory (DRAM) of a large capacity that operates as a FIFO. The DRAM may be refreshed between VBI's. A given storage location of the FIFO may be addressed by a read address pointer during the memory read-out operation and by a write address pointer during the VBI's when memory store-in operation occurs. By using separate read and write address pointers, the aforementioned advantage of storing Data-lines while the read-out operation is incomplete may be realized.

A television apparatus, embodying an aspect of the invention, is responsive to an incoming television signal containing video lines that carry text data, defining corresponding data lines for generating an output signal that is capable of providing picture information to a display device. A first control signal is generated in order to select one of the data lines to be used in conjunction with the generation of the output signal. A first-in, first-out background memory has a data input that is coupled to an output of a source of the television signal. Storage of corresponding data lines of the television signal in the background memory occurs each time such corresponding data lines occur. Prior to the time the first control signal is generated, the background memory already contains a substantial number of stored data lines of the television signal. During a given interval that follows the generation of the first control signal, read-out from the background memory of a plurality of data lines of the television signal that have been stored before the end of the given interval occurs. The given interval has a duration that is substantially shorter than that of a corresponding interval between the occurrence of the first one of the plurality of data lines and the occurrence of the last one so as to reduce access time to the plurality of data lines. Read-out of the plurality of data lines occurs in a first-in, first-out manner for generating during the given interval a data signal that contains the data of the plurality of data lines, including data lines that have been stored in the background memory during the given interval. A data processor is responsive to the data signal for selecting the one data line to generate in accordance therewith the output signal.

FIG. 2 illustrates a block diagram of a rapid access teletext decoder, embodying an aspect of an invention. Similar symbols and numerals in FIGS. 1 and 2 indicate similar items or functions.

Figure 2:
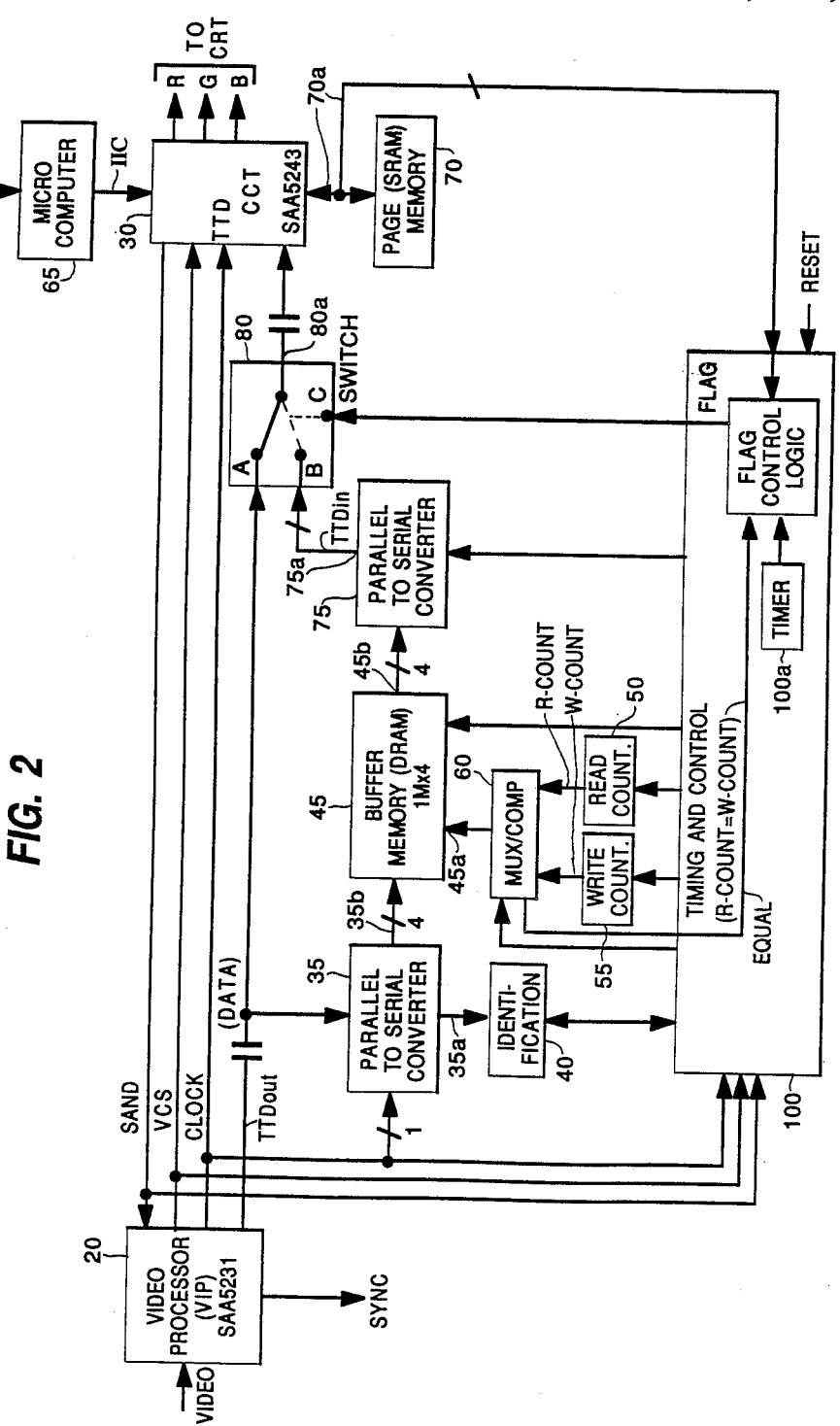
FIG. 2 illustrates a rapid access teletext decoder, embodying a feature of the invention.

A baseband composite video signal VIDEO of FIGURE 2 is coupled from a video detector, not shown, to a VIP 20, such as, for example, of the type SAA5231. VIP 20 generates from signal VIDEO a serial data signal TTDout at a bit rate of 6.9375 MHz and a corresponding clock signal CLOCK that provides timing information of the bits of signal TTDout. VIP 20 also generates a video composite sync signal VCS derived from signal VIDEO. Signal VCS is coupled to a CCT 30 such as, for example, of the SAA5243 IC type. In turn, CCT 30 generates a signal SAND containing the phase locking and color burst blanking information. Signal SAND is coupled back to VIP 20 to provide horizontal phase-locking information to an oscillator of VIP 20, not shown.

The serial data contained in signal TTDout are coupled to a serial-to-parallel converter 35 that includes a shift register, not shown. Serial-to-parallel converter 35 generates a parallel word 35a that is coupled to an identification unit 40.

In accordance with an aspect of the invention, unit 40 tests for the occurrence, in signal TTDout, of a 12-bit sequence (101011100100) of bits in the data stream, representing a 4-bit clock run-in sequence immediately followed by the framing code. The checking for the occurrence of such 12-bit sequence is performed during a time window of 2.7 microsecond, starting 11.8 microseconds after the leading edge of a horizontal sync portion, not shown, of signal VIDEO. Such checking is done for each video line during the possible teletext lines, 6-22 and 319-335, that occur in the VBI's of the corresponding field portions of signal VIDEO.

When the 12-bit sequence is recognized, it is assumed that the video line represents a Data-line of teletext. After an assumed Data-line is identified, only, for example, 344 bits of the assumed data-line are stored in a buffer memory 45, operating as a FIFO. Advantageously, the checking for the 4-bit clock run-in sequence reduces a probability that nonteletext data of a video line that is not a Data-line will be stored in memory 45.

A timing and control unit 100 receives signals SAND, VCS and CLOCK and generates corresponding control signals that, for example, control the operations associated with memory 45, such as the operation of identification unit 40.

It may be desirable to utilize a DRAM IC of a large storage capacity such as, for example, of the 1,098,586 ($2^{20}$) bit organization as the main storage element of buffer memory 45. This is so in order to provide a storage capacity for a substantial number of teletext Pages. Also, in order to reduce the cost and power dissipation of memory 45 it may be desirable to utilize DRAM's with slow access or cycle time that are typically less expensive. Therefore, the serial teletext data in signal TTDout is converted by converter 35 to 4-bit parallel words, or nibbles 35b. The bits of each nibble 35b are stored simultaneously in buffer memory 45, organized as, for example, a four-bit-wide DRAM. In this way, the DRAM cycle time may be longer than the teletext bit rate.

For each assumed Data-line, the nibble that is firstly stored in buffer memory 45 corresponds to the most significant nibble of the framing code. Thereafter, the remaining consecutively occurring 85 nibbles are stored. The clock run-in bits need not be stored.

Figure 5:
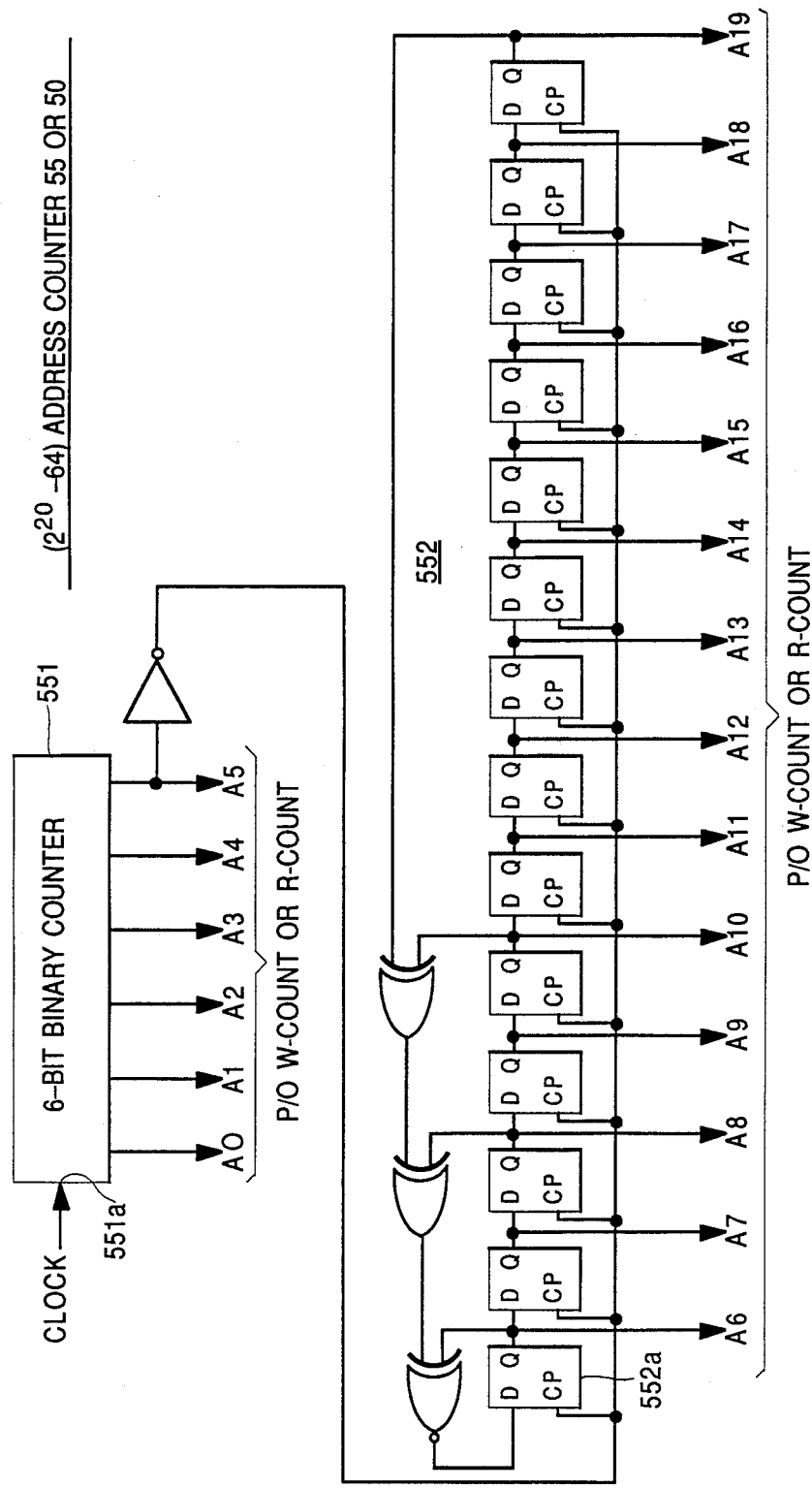
FIG. 5 illustrates a detail schematic of a linear feedback shift register that is used to provide an address pointer for a background memory of FIG. 2.

A write counter 55 generates a write address pointer, or word W-COUNT that is coupled via a multiplexer/comparator 60 to an address port 45a of memory 45. FIG. 5 illustrates a combination of a schematic diagram and a block diagram of counter 55 of FIG. 2. Similar numerals and symbols in FIGS. 2 and 5 indicate similar items or functions.

Write counter 55 of FIG. 5 includes a 6-bit conventional binary counter 551 that produces 6 bits, A0-A5, of word W-COUNT. The most significant bit of counter 551, bit A5, is coupled to a corresponding clock input terminal CP of each flip-flop of a conventional 14-bit linear feedback shift register (LFSR) counter 552. Counter 552 includes 14 D-type flip-flops that form a shift register The input to a data input terminal of a first flip-flop 552a in the shift register chain of the flip-flops is formed by applying suitable EXCLUSIVE OR operations on output signals of the first, third, fifth and fourteenth flip-flops in the shift register chain, in a well known manner.

LFSR counter 552 requires less hardware and is faster than a conventional binary counter since it avoids the carry propagation associated with the conventional binary counter. LFSR counter 552 goes through a complete sequence cycle every $2^{14}-1$ pulses of bit A5 of binary counter 551. Binary counter 551 goes through a complete sequence cycle every $2^6$ clock pulses at an input terminal 551a of counter 551. Consequently, each of counter 55 and word W-COUNT sequences through a complete predetermined cyclical sequence every $2^{20}-64$ clock pulses that occur at input terminal 551a.

The address of each nibble that is stored is supplied by word W-COUNT of counter 55 of FIG. 2. The value of word W-COUNT is changed to the next or consecutive value in the predetermined cyclical sequence of counter 55 after each nibble is stored. The number of different values in such cyclical sequence that is, for example, ($2^{20}-64$), is equal to the number of nibble storage locations utilized in memory 45. Therefore, advantageously, each DRAM, having $2^{20}$ locations, is substantially fully utilized. The number ($2^{20}-64$) is equal to an integer multiple of 86, the number of nibbles required for storing the 344 bits of each Data-line. As a result of the FIFO operation, a maximum of ($2^{20}-64$) divided by 86 of the most recently received Data-lines can be stored in buffer memory 45 of FIG. 2.

Figure 3:
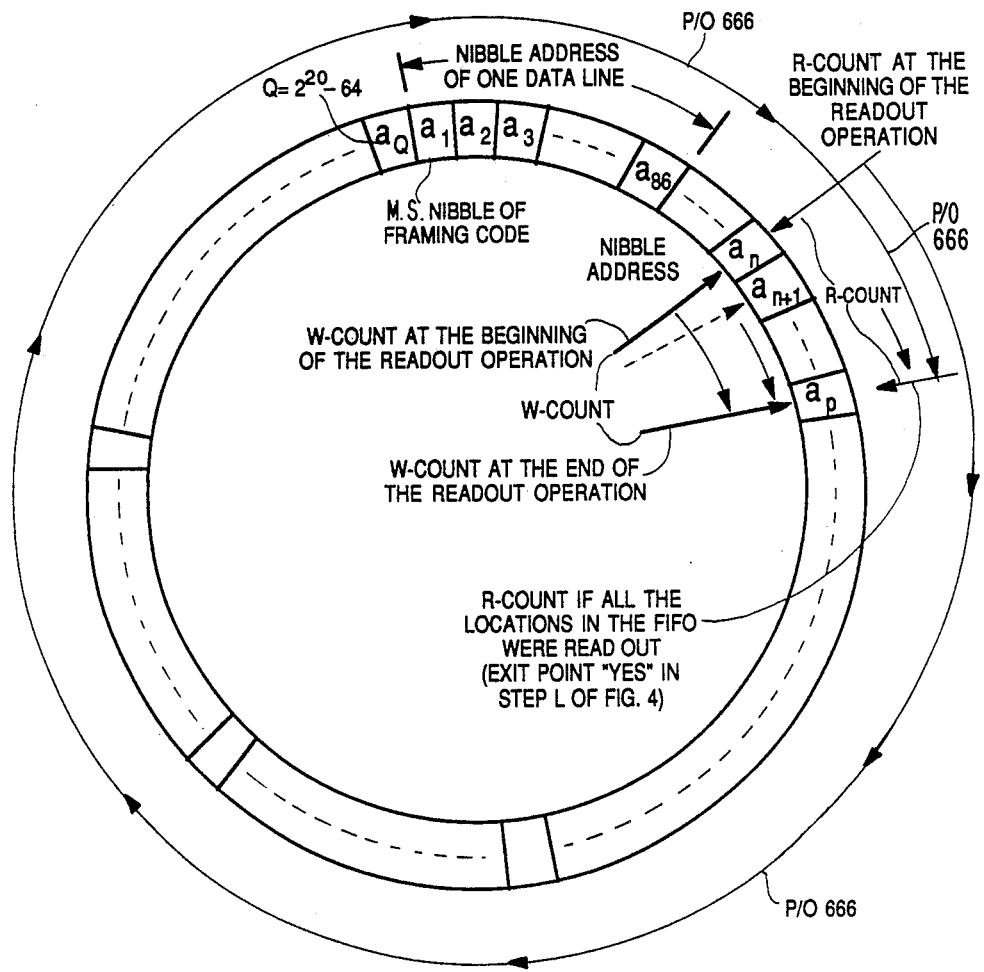
FIG. 3 illustrates a diagram that is useful for explaining the operation of a first-in, first-out background memory of FIG. 2.

FIG. 3 illustrates, schematically, the cyclical sequence of word W-COUNT of write counter 55. Similar numbers and symbols in FIGS. 2, 3 and 5 depict similar items or functions. The cyclical sequence includes $2^{20}-64$ values distributed in a circular manner from $a_1$ to $a_Q$ where $Q=2^{20}-64$. Thus, for example, after a nibble location, depicted as $a_n$ in FIG. 3, is stored in memory 45 of FIG. 2, the next nibble to be stored in memory 45 is stored in a location depicted as $a_{n+1}$ in FIG. 3, and so forth.

The number of different values in the cyclical sequence of counter 55 of FIG. 2 is equal to an integer multiple of 86. Therefore, Data lines are stored, for example, always in the same corresponding groups of 86 nibbles of memory 45, such as, for example, $a_1-a_{86}$ of FIG. 3. The most significant nibble of the framing code is stored, for example, always at the same memory locations of memory 45. This feature, advantageously, simplifies the hardware complexity of unit 100 of FIG. 2 that controls memory 45.

Figure 4:
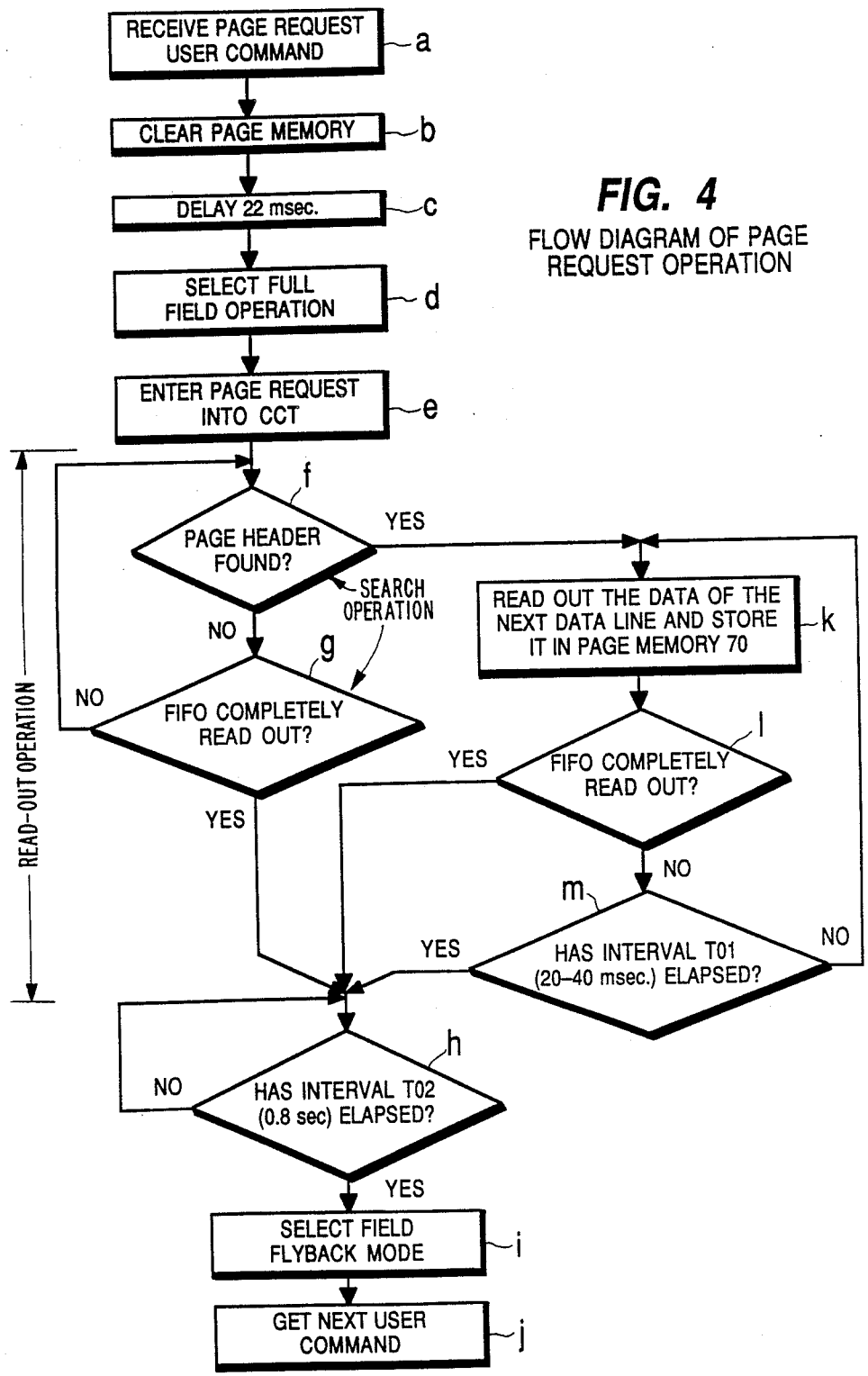
FIG. 4 illustrates a flow chart that is useful for explaining the operation of the teletext decoder of FIG. 2.

FIG. 4 is a flow chart depicting the operation of the teletext decoder of FIG. 2 after a page request for displaying requested Page on a CRT, not shown, is initiated by the user. Similar numerals and symbols in FIGS. 2-5 indicate similar items or functions. A given user page request that is communicated to a microcomputer 65 of FIG. 2 via a keyboard, not shown, causes microcomputer 65 to generate a clear page memory command signal. Such command signal is coupled via a conventional IIC bus to CCT 30. CCT 30 stores in all the memory locations of a page memory 70, in response to the clear page memory command signal, "blank" characters, referred to as page memory clearing operation. After a 22 millisecond interval of the memory clearing operation has elapsed, microcomputer 65 sends a second command signal to CCT 30 that causes CCT 30 to begin operating in a mode of operation referred to as full channel operation mode, as shown in step d of FIG. 4.

In the full channel operation mode, data is received by CCT 30 of FIG. 2 during each video line in a given frame interval of signal VIDEO. In comparison, in normal field flyback operation mode, data is received for processing by CCT 30 only during lines 6–22 and 319–325 of the VBI's of the corresponding field intervals of signal VIDEO.

In a next step, e, of FIG. 4, microcomputer 65 30 of FIG. 2 sends a corresponding page request command signal to CCT 30. As a result, CCT 30 stores, via a bus 70a, a corresponding word in page memory 70 containing a bit referred to as Page Being Looked For (PBLF) bit at a TRUE state. Simultaneously, timing and control unit 100 decodes the information on bus 70a and a corresponding flip-flop, not shown, of unit 100 causes a control signal FLAG to assume a TRUE state that initiates a read-out interval, or operation in memory 45.

To perform the read-out operation in memory 45, a read address counter 50, controlled by unit 100, is utilized. Counter 50 that may be constructed similarly to Counter 55 generates a read address pointer, of word R-COUNT that is coupled via multiplexer/comparator 60 to address port 45a of memory 45. Immediately prior to the time in which the first memory location of memory 45 is read out following the page request command signal, that defines the beginning time of the read-out operation, counter 50 is preset to form word R-COUNT having a value that is identical to that already contained in word W-COUNT. Word W-COUNT is coupled via timing and control unit 100 to an input port 50a of read address counter 50. In order to preset counter 50, a control signal is coupled to a corresponding terminal of port 50a, thereby causing the value of word W-COUNT to be stored in counter 50. The result is that word R-COUNT is made equal to word W-COUNT. An example of an initial condition of the read-out operation is depicted in FIG. 3 by the arrows representing words R-COUNT and W-COUNT that point both to location $a_n$.

A parallel-to-serial converter 75 of FIG. 2, converts each nibble 45b generated at a read-out output port of memory 45 to a serial data signal TTDin. The bits of signal TTDin at a terminal 75a of converter 75 occur at the standard teletext bit-rate. After each location is read out from memory 45, word R-COUNT changes to contain the consecutive value in the cyclical sequence that was mentioned before and the content of the next consecutive location is read out. Thus, the arrow in FIG. 3 that represents schematically word R-COUNT "moves" angularly in the same angular direction that has been associated with the "movement" of &he arrow representing word W-COUNT. As a result, signal TTDin of FIG. 2 contains data lines that correspond with the originally stored data-lines of signal VIDEO and that are read out from memory 45 in a first-in, first-out manner.

Serial data signal TTDin is coupled via a switch 80, controlled by signal FLAG, to a teletext data input terminal TTD of CCT 30 when signal FLAG is TRUE. Signal TTDin is processed by CCT 30 in the full channel operation mode. Therefore, advantageously, the length of the read-out interval that is required for reading out and processing in CCT 30 a given number of corresponding Data lines that are contained in signal TTDin is, advantageously, substantially shorter than if such Data lines were received at input terminal TTD of CCT 30 only during the VBI's.

In steps f and g of FIG. 4, CCT 30 of FIG. 2 performs a search operation for identifying, in signal TTDin, a Data-line representing the Page Header data line of the user requested page, as depicted in an exit point "yes" from step f of FIG. 4. The Page Header is recognized in CCT 30 of FIG. 2, unlike in unit 40, by utilizing also hamming code checking When the Page-Header data line is identified, CCT 30 stores a corresponding word in page memory 70 via bus 70a that is related to the Page-Header and that causes bit PBLF to become FALSE. Afterwards, as shown in steps k, 1 and m of FIG. 4, Data lines are read out from memory 45 of FIG. 2. Each Data line that is related to the requested Page is identified in a well known manner and stored in page memory 70.

In accordance with another feature of the invention, at the end of a time-out interval TO1 following the time when bit PBLF becomes FALSE, timer 100a of FIG. 2 causes signal FLAG to become FALSE. This situation is shown in an exit point "yes" in step m of FIG. 4. Consequently, the read-out operation that is controlled by unit 100 terminates. Termination of the read-out operation may also occur prior to the end time of interval TO1, as described later on. Time-out interval TO1, has a length of, for example, between 20–40 milliseconds, from the time bit PBLF became FALSE. During interval TO1, the read out operation continues in a similar manner that was explained before in the full channel operation mode of CCT 30.

It is assumed that the entire requested Page can be read out of memory 45 during interval TO1 following the time the Page-Header data line is identified. Thus, if, for example, two Page Headers that represent the same requested Page are stored in memory 45, only the first one to be read out during interval TO1 is processed by CCT 30; whereas, the other Page Header and the corresponding Data-lines associated with that Page are not read out of memory 45 during interval TO1 and are neither received nor processed in CCT 30.

Terminating the read-out operation after interval TO1 has elapsed, advantageously, prevents a visually undesirable condition from occurring in which the teletext picture on the CRT, not shown, changes, for example, twice for a given user page request. Such undesirable condition could have occurred as a result the aforementioned two Page-Headers that are stored in memory 45.

The read-out operation also terminates, prior to the end of interval TO1, when it is detected that all the data stored in memory 45 have been read out. Such situation occurs, for example, if no Data-line stored in memory 45 that contains the Page Header is identified, as shown in step g of FIG. 4. Such situation also occurs at an exit point "yes" in step 1.

When all the data stored in memory 45 of FIG. 4 have been read out, prior to the end of interval TO1, an output signal EQUAL of the comparator portion of multiplexer/comparator 60 of FIG. 2 becomes TRUE. Signal EQUAL becomes TRUE when word R-COUNT becomes equal to word W-COUNT. Signal EQUAL at the TRUE state causes signal FLAG to become FALSE that causes the read-out operation to terminate. Signal FLAG is prevented from assuming the TRUE state until after word R-COUNT is incremented at least once. Thus, signal FLAG will not assume prematurely the TRUE state.

The situation when signal EQUAL becomes TRUE in step 1 or g of FIG. 4 is depicted by the position of the arrow in FIG. 3 representing word R-COUNT. After moving angularly around the circle, that arrow points to the same location, at the end of the read-out operation of memory 45 of FIG. 2, as the arrow representing word W-COUNT of FIG. 3.

During the read-out operation, read out memory cycles in memory 45 of FIG. 2, depicted in steps f, g, k, l and m of the flow chart of FIG. 4, occur only outside the VBI of each field interval of signal VIDEO of FIG. 2. Because the storage capacity of memory 45 is large, the read-out operation may require a substantially longer period than one period between a pair of consecutive VBI's.

In accordance with another aspect of the invention, during the intervening VBI's, that occur from the time the read-out operation begins to the time the read-out operation terminates, the Data-lines that occur then in signal VIDEO are stored in memory 45 that operates as a FIFO. Data-lines that are stored in memory 45, during the intervening VBI's of the read-out operation, or interval, are made available for processing by CCT 30, if required, during the read-out operation. Advantageously, this feature prevents an undesirable situation in which, instead of a complete Page, only a partial Page is derived from the data lines stored in memory 45 and displayed on the CRT, not shown. Such partial Page might have been displayed if some Data-lines, associated with the same requested Page, occur in signal VIDEO but were not stored in memory 45 during the intervening VBI's that occur after the time the read-out operation began. If such Data-lines were not stored in memory 45, they cannot be processed in CCT 30 in step k of FIG. 4. Consequently, they will not be stored in page memory 70 of FIG. 2.

Assume, for explanation purpose, that the position of the arrow representing word W-COUNT in FIG. 3 has changed angularly as a result of storing Data-lines in memory 45 of FIG. 2 during the intervening VBI's that occur prior to the termination of the read-out operation. The position of such arrow has changed from the initial position, pointing to location $a_n$ of FIG. 3, to a new position pointing to location $a_p$. During the read-out operation, the data of the data lines that were stored during the intervening VBI's may be read out and the position of the other arrow, representing word R-COUNT, may "move" angularly around the circle more than a full circle, as shown by a helix 666. Thus, when the arrow representing word R-COUNT points to the same location, $a_p$, at the end of such read-out operation, signal EQUAL of FIG. 2 will become TRUE. Signal EQUAL indicates that of all the data in the FIFO has been read out, as shown in exit point "yes" of step 1 of FIG. 4.

The read-out operation from memory 45 of FIG. 2 may terminate, in an exit point "yes" step g of FIG. 4, when no Page-Header data line has been identified or in an exit point "yes" of step 1. Termination at each of these exit points occurs prior to the end time of interval TO1 and after all the memory locations of memory 45 of FIG. 2 have been read out.

It is assumed that all the memory locations of memory 45 have been read out after a second time-out interval TO2 of, for example, 0.8 seconds, has elapsed from the time microcomputer 65 has sent the page request command signal to CCT 30. The page request command signal has been referred to in step e of FIG. 4.

In accordance with a further aspect of the invention, after interval TO2 has elapsed, microcomputer 65 of FIG. 2 sends a command signal to CCT 30 that causes CCT 30 to operate in a field flyback operation mode. Advantageously, microcomputer 65 establishes time out interval TO2 by a software routine without the need for obtaining information from CCT 30 or from unit 100.

At the end of the read-out operation, signal FLAG of FIG. 2 becomes FALSE, as explained before. In the FALSE state of signal FLAG, switch 80 couples signal TTDout of VIP 20 to terminal TTD of CCT 30, directly, in preparation for field flyback operation mode of CCT 30 that follows, as described below.

In the field flyback operation mode, signal FLAG is FALSE, as explained before, and signal TTDout is coupled to terminal TTD and processed by CCT 30 such that memory 45 is bypassed. Thus, incoming teletext Data-lines related to the Page that is displayed on the CRT are processed in the field flyback operation mode of CCT 30 only during the VBI's, in a conventionally known manner.

Figure 1:
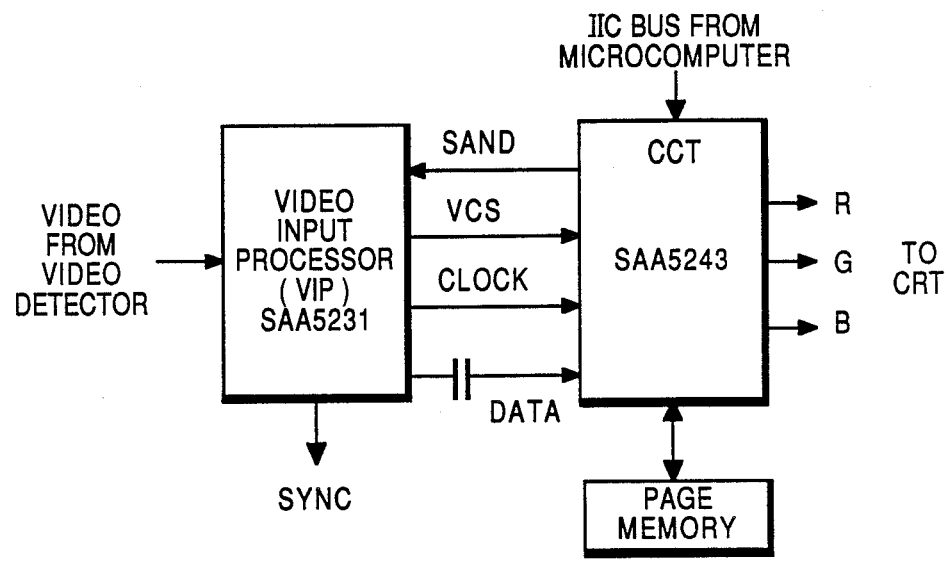
FIG. 1 illustrates a prior art teletext decoder.

Because memory 45 is a serial memory, or FIFO, the memory location in memory 45 in which a given Data line of signal VIDEO or of signal TTDin is stored is "transparent" with respect to CCT 30. Therefore, advantageously, CCT 30 can be implemented using the same type IC, such as of the SAA5243 type, that is used in the prior art teletext decoder of FIG. 1. Thus, inclusion of memory 45 of FIG. 2 in the teletext decoder does not have to affect the hardware complexity of CCT 30.

Timing and control unit 100 controls the appropriate timing of the identification operation of unit 40 during the VBI window. It controls the store-in and the read-out operations and the refreshing of the DRAM's of memory 45. Modern DRAM's may have to go through a refresh cycle every, for example, 8 msec, in each of 512 address rows of the DRAM. To accomplish the refresh cycles during the read-out operation, nine (9) predetermined bits of word R-COUNT of read address counter 50, such as, for example, A0–A6, A13 and A15 of FIG. 5, are applied to the row address lines of the DRAM's during the read-out operation The nine predetermined bits change in counter 50 during the read-out operation in such a way that at least all the 512 possible binary combinations of the nine bits occur within each 8 millisecond interval. A read cycle, besides accessing a particular memory location, also performs a refresh cycle of the memory address row that is addressed. In this way, during the read-out operation, all the 512 address rows of the DRAM's are refereshed.

When no read-out operation occurs in memory 45, such as when no page request is pending, unit 100 effectuates what is known as "CAS before RAS" refresh operation. In the "CAS before RAS" refresh operation, CAS and RAS control signals of the DRAM's, not shown, are generated by unit 100 at a predetermined rate to form refresh cycles. On the other hand, when a page request is pending, the read-out operation occurs and the aforementioned "CAS before RAS" refresh operation is replaced by read cycles that occur during the read-out operation. Thus complete refresh operation of the DRAM's is guaranteed.

What is claimed is:

1. A television apparatus responsive to an incoming television signal containing video lines that carry text data, defining corresponding data lines, for generating an output signal that is capable of providing picture information to a display device, comprising:

means for generating a first control signal in order to select one of said data lines to be used in conjunction with the generation of said output signal;

a source of said television signal;

a first-in, first-out background memory having a data input that is coupled to an output of said source;

first control means coupled to said background memory for controlling storage therein of corresponding data lines of said television signal, wherein prior to the time said first control signal is generated, said background memory already contains a substantial number of stored data lines of said television signal;

second control means responsive to said first control signal and coupled to said background memory for controlling during a given interval that follows the generation of said first control signal, read-out from said background memory of a plurality of data lines of said television signal that have been stored before the end of said given interval, said given interval having a duration that is substantially shorter than that of a corresponding interval between the occurrence of an initial data line of said plurality of data lines and the occurrence of a final data line thereof so as to reduce access time to said plurality of data lines, said second control means controlling read-out of said plurality of data lines in a first-in, first-out manner for generating during said given interval a data signal that contains the data of said plurality of data lines including data lines that have been stored in said background memory during said given interval; and a data processor responsive to said data signal for selecting said one data line to generate in accordance therewith said output signal.

2. An apparatus according to claim 1 wherein said data lines occur in said television signal only during corresponding vertical blanking intervals, wherein, during said given interval, said data processor operates in a full channel mode of operation, and wherein, prior to the time when said first control signal is generated, said data processor operates in a field flyback mode of operation.

3. An apparatus according to claim 1 further comprising, means for coupling said data signal and said television signal to said data processor such that prior to the time said first control signal is generated said television signal is coupled to said data processor in a manner that bypasses said background memory.

4. An apparatus according to claim 3 wherein, throughout said given interval, said coupling means decouples said signal that bypasses said background memory from said data processor.

5. An apparatus according to claim 1 further comprising, a switch having a first input that is coupled between said output of said source of said television signal and said data input of said background memory, a second input that is coupled to a data output of said background memory and a switch output that is coupled to an input of said data processor.

6. An apparatus according to claim 5 further comprising, means for generating a second control signal that is coupled to a control input of said switch, said second control signal having a first state for enabling said switch to couple the signal that is developed at said second input of said switch to said data processor following the time when said first control signal is generated and having a second state, for enabling said switch to couple the signal that is developed at said first input thereof to said data processor following the occurrence of the earlier of (a) a time when all the data stored in said background memory has been read out, and (b) a time when a first time-out interval has elapsed from a time when said data processor selects the data of a Page Header data line.

7. An apparatus according to claim 5 further comprising, means coupled to said background memory, for generating, in accordance with the data of said plurality of data lines, a serial bit data signal that contains corresponding data lines that are read out of said background memory in a first-in, first-out manner, said serial bit data signal being coupled to said second input of said switch, said switch coupling said serial bit data signal to said input of said data processor, during said given interval, and coupling the signal that is developed at said first input of said switch to said input of said data processor, outside said given interval.

8. An apparatus according to claim 1 wherein, as a result of reading out the data of said plurality of data lines in the first-in, first-out manner, memory addresses, where said plurality of data lines are stored in said background memory are transparent to the operation of said data processor.

9. An apparatus according to claim 1 wherein said data processor is included in an integrated circuit of the same type used in a conventional teletext decoder such that said background memory provides an add-on feature.

10. An apparatus according to claim 1 wherein said television signal comprises a teletext signal and wherein said television apparatus comprises a teletext decoder.

11. An apparatus according to claim 10 wherein said data lines of said television signal define corresponding pages of teletext data, wherein said background memory is capable of containing at a given time the data of a substantial number of said pages and wherein, during said given interval, said data processor selects from the data that is read out of said background memory the data of a first page, in accordance with said one of said data lines that is a Page-Header data line, to generate from the data of said first page said output signal.

12. An apparatus according to claim 1 further comprising, a page memory wherein said output signal is stored in said page memory during said given interval.

13. An apparatus according to claim 1 further comprising, a switch for coupling one of said data signal that is generated at an output of said background memory and a second data signal, that bypasses said background memory, to an input of said data processor when a second control signal that is developed at a control input of said switch is at first state and for coupling the other one of said to said input of said data processor when said second control signal is at a second state.

14. An apparatus according to claim 13 further comprising, means for generating, during said given interval, a first time-out signal after an interval having a predetermined duration has elapsed from a time when the data of said one of said data line that is a Page Header data line has been identified in said data signal and means responsive to said first time-out signal for generating said second control signal in accordance with said first time-out signal .

15. An apparatus according to claim 13 further comprising, means for generating a signal that is indicative of when the data of all the da&a lines that are stored in said background memory have been read out and that is coupled to said control input of said switch to control the state of said second control signal.

16. A television apparatus according to claim 1 wherein said data processor is responsive, outside said given interval, to data lines of said television signal that are coupled to said data processor in a manner that bypasses said background memory.

17. An apparatus according to claim 1 further comprising, a parallel-to-serial converter that is coupled between an output of said background memory and an input of said data processor.

18. A television apparatus according to claim 1 wherein said background memory comprises a random access memory, wherein said first control means comprises first sequencing means that is coupled to an address input of said random access memory for generating a write-in address word and wherein said second control means comprises second sequencing means for generating a read-out address word that is coupled to said address input.

19. An apparatus according to claim 18 wherein at least one of said first and second sequencing means comprises a linear feedback shift register counter.

20. An apparatus according to claim 18 wherein each of said data lines includes a corresponding plurality of data line portions that are stored in corresponding locations in said background memory having corresponding addresses, wherein said first sequencing means changes states in a cyclical manner each time a given one of said portions of each data line is stored such that the number of states in each cycle is equal to an integer multiple of the total number of data lines that can be stored in said background memory in each cycle.

21. An apparatus according to claim 20 wherein the number of memory addresses that are required for storing a given data line is equal to 86.

22. An apparatus according to claim 20 wherein the number of said states in each cycle is equal to 23. A television apparatus according to claim 1 further comprising, a page memory responsive to said output signal for storing said output signal therein.

24. An apparatus according to claim 1 wherein said data processor operates in a full channel mode of operation throughout said given interval and wherein said television signal contains said data lines only during corresponding vertical blanking intervals thereof.

25. An apparatus according to claim 1 wherein said first control means identifies, in a given video line signal, data of a clock run-in portion of said video line signal and stores in said background memory text data of such video line signal provided that said data of said clock run-in portion is identified.

26. An apparatus according to claim 25 wherein said said first control means identifies said given data line also in accordance with data of a framing code.

27. An apparatus according to claim 1 wherein said first control signal is indicative of when a user initiated page request has occurred and causes said data processor to operate in a full channel mode of operation during said given interval.

28. An apparatus according to claim 27 further comprising, means for generating a second control signal that is indicative when a predetermined time-out interval has elapsed from the time said first control signal is generated, said second control signal being coupled to said data processor for causing said data processor to start operating in a field flyback mode of operation following said time-out interval irrespective of whether said one of said data lines that is a Page Header of the page requested has been selected.

29. An apparatus according to claim 28 wherein said second control signal is generated in a microprocessor such that said time out interval is determined by a program thereof.

30. A television apparatus responsive to an incoming television signal containing video line signals that carry text data, defining corresponding data lines, for generating an output signal that is capable of providing picture information to a display device, comprising:

means for generating a first control signal in order to select one of said data lines to be used in conjunction with the generation of said output signal;
a source of said television signal;
a first-in, first-out background memory having a data input that is coupled to said source;
first control means coupled to said background memory for controlling storage therein of corresponding data lines of said television signal, wherein prior to the time said first control signal is generated, said background memory already contains a substantial number of stored data lines of said television signal;
second control means responsive to said first control signal and coupled to said background memory for controlling during a given interval that follows the generation of said first control signal, read-out from said background memory of a plurality of stored data lines of said television signal, such that the duration of said given interval is substantially shorter than that of a corresponding interval between the occurrence of an initial data line of said plurality of data lines and the occurrence of a final data line thereof, so as to reduce access time to said plurality of data lines, said second control means controlling read-out of said plurality of data lines in a first-in, first-out manner for generating during said given interval a data signal that contains the data of said plurality of data lines;
a switch having a first input that is coupled to said source of said television signal, having a second input that is coupled to a data output of said background memory and having an output for generating a second data signal;
a data processor responsive to said second data signal for selecting said one data line to generate in accordance therewith said output signal; and
means for generating a second control signal that is coupled to a control input of said switch, said second control signal having a first state for enabling said switch to couple to said data processor after said first control signal is generated the signal that is developed at said switch second input, and having a second state for enabling said switch to couple to said data processor the signal that is developed at said first switch input following the occurrence of the earlier of (a) a time when all the data stored in said background memory has been read out, and (b) a time when a time-out interval has elapsed from a time when said data processor selects said one data line that is a Page Header.

31. A television apparatus responsive to an incoming television signal containing video lines that carry text data, defining corresponding data lines, for generating an output signal that is capable of providing picture information to a display device, comprising:

first means for generating a first control signal in order to select one of said data lines to be used in conjunction with the generation of said output signal;

second means responsive to said television signal for generating a clock signal that is indicative of timings of individual bits of a data sequence of a clock run-in portion of a data line;

a source of said television signal;

a first-in, first-out background memory having a data input that is coupled to said source;

third means coupled to said background memory and responsive to said television signal and to said clock signal for identifying in a given video line, said data sequence of said clock run-in portion of said data line and for storing in said background memory such video lines that are identified as data lines but only when individual bits of said data sequence of said clock run-in portion are correct, said first means storing said data lines such that prior to the generation of said first control signal, said background memory already contains a substantial number of stored data lines of said television signal;

fourth means responsive to said first control signal and coupled to said background memory for controlling during a given interval that follows the generation of said first control signal, read-out from said background memory of a plurality of stored data lines of said television signal, such that the duration of said given interval is substantially shorter than that of a corresponding interval between the occurrence of an initial data line of said plurality of data lines and the occurrence of a final data line thereof, so as to reduce access time to said plurality of data lines, said fourth means controlling read-out of said plurality of data lines in a first-in, first-out manner for generating during said given interval, a data signal that contains the data of said plurality of data lines; and a data processor responsive to said data signal for selecting said one data line to generate in accordance therewith said output signal.

32. An apparatus according to claim 31 wherein said third means identifies said video line as data line when data sequence of a framing code portion immediately follows said data sequence of said clock run-in portion 33. An apparatus according to claim 31 wherein said third means identifies said video line as data line by identifying a 12 bit sequence (101011100100) in data that are derived from said video line.

* * * * *

UNITED STATES PATENT AND TRADEMARK OFFICE
CERTIFICATE OF CORRECTION

PATENT NO. : 4,931,870

DATED : June 5, 1990

INVENTOR(S) : WILLEM DEN HOLLANDER

It is certified that error appears in the above-identified patent and that said Letters Patent is hereby corrected as shown below:

| | |
|---|---|
| Col. 6, line 37 | "a∫" should be -- $a_1$ -- |
| Col. 7, line 10 | "30" should be deleted |
| Col. 7, line 54 | "&he" should be -- the -- |
| Col. 12, line 56 | after "said" (first occurrence) insert -- data signal that is generated at an output of said background memory and said second data signal -- |
| Col. 13, line 1 | "da&a" should be -- data -- |
| Col. 13, line 40 | after "to" insert -- $(2^{20} - 64)$ -- |

Signed and Sealed this

First Day of December, 1992

Attest:

DOUGLAS B. COMER

Attesting Officer

Acting Commissioner of Patents and Trademarks